Dec. 20, 1955     C. O. McKINNEY     2,727,367
LIQUIFIED PETROLEUM GAS PRODUCTION
Filed April 21, 1955
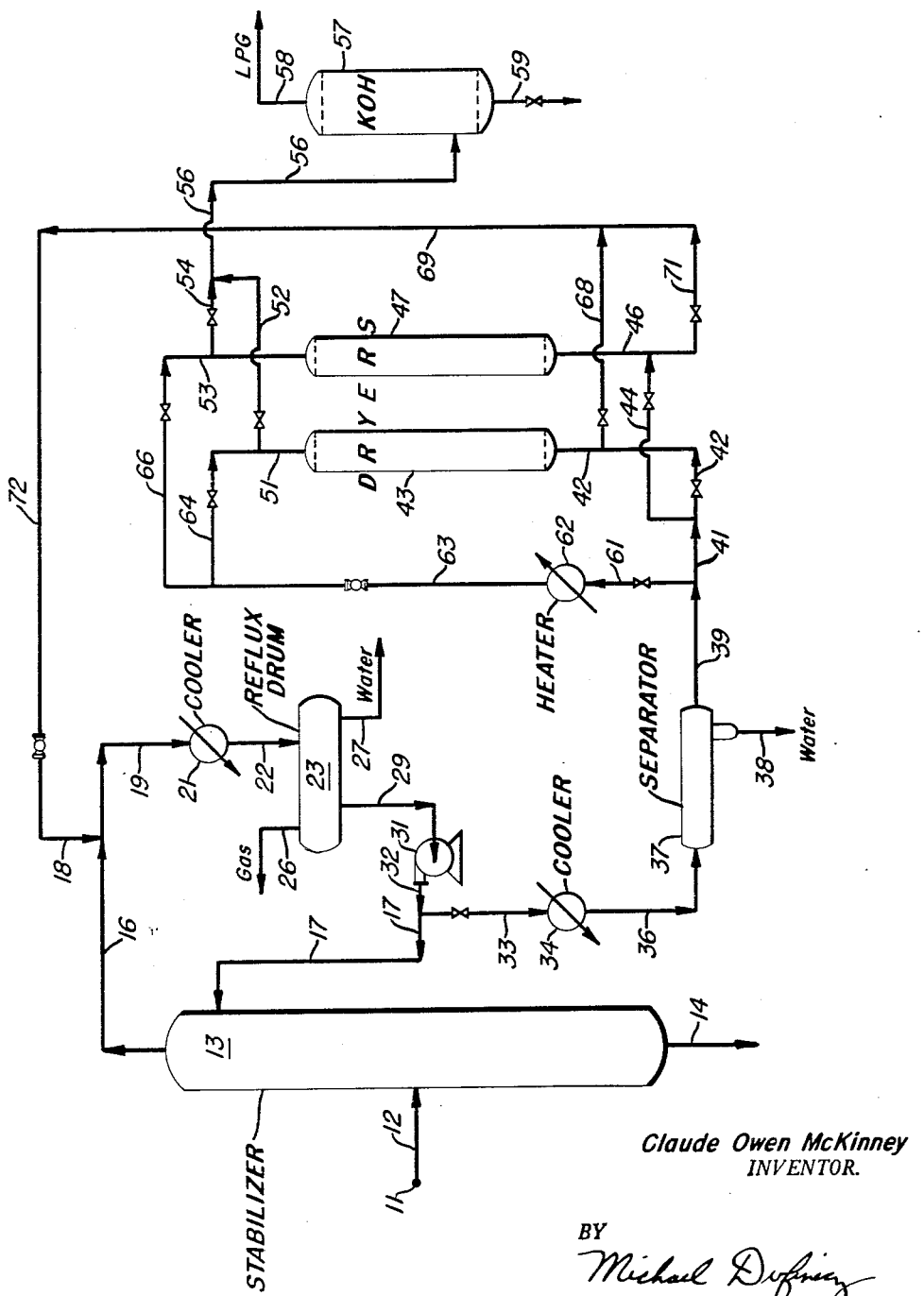
Claude Owen McKinney
INVENTOR.
BY
*Michael Dufiney*
ATTORNEY

United States Patent Office 2,727,367
Patented Dec. 20, 1955

2,727,367

LIQUIFIED PETROLEUM GAS PRODUCTION

Claude Owen McKinney, Hammond, Ind., assignor to Standard Oil Company, Chicago, Ill., a corporation of Indiana Application April 21, 1955, Serial No. 503,122

6 Claims. (Cl. 62—175.5)

This invention relates to liquified petroleum gas, i. e., liquid propane, liquid butane, and mixtures thereof. More particularly, the invention relates to a more economical process for the production of liquified petroleum gas.

Liquified petroleum gas (LPG) now occupies a large and expanding place in the domestic utility area. The use of LPG for cooking, heating in homes, and as automotive fuel is very great. Specifications have been placed on LPG, both with respect to sulfur content and with respect to water content. The LPG must be essentially free of water, either dispersed water or dissolved water, in order to insure that ice formation will not clog small diameter nozzles and lines frequently used in LPG service.

The most common method of dehydrating liquid propane or liquid butane which is to be used in LPG service is passage through a bed of solid adsorbent material, such as alumina, bauxite, or silica gel. Commercial operation requires that the spent adsorbent be revivified. This is most commonly done by heating the spent adsorbent material to a high temperature with enclosed coils or by direct contact with superheated steam. There is also used a technique wherein propane gas or butane gas is heated to an elevated temperature and the hot gas passed through the bed of spent adsorbent to desorb the water. The stream of gas and water vapor exiting from the bed of adsorbent is most frequently passed to fuel gas systems and used as fuel—this represents an economic loss, since the value as LPG is greater than the value as fuel. In another procedure, the exit stream of gas and water vapor is condensed, the liquid water is decanted from the liquid propane and the liquid propane is then reused for the generation of hot gas. This procedure requires the use of a separate large condenser and also the presence of a compressor and a pump to permit circulation of the revivifying gas in a closed circuit through the adsorbent beds.

An object of the invention is a more economical procedure for the production of liquified petroleum gas. A particular object is a process for producing specification LPG which does not require a separate closed circuit system for the revivifying gas. Another object is a process for the production of LPG wherein the fractionating zone producing the raw material for the liquified petroleum gas is utilized as a portion of the LPG facilities. Other objects will become apparent in the course of the detailed description.

In the process of the instant invention, the revivifying gas and water vapor exiting from the bed of adsorbent being revivified is at a pressure in excess of the pressure existing in the transfer line which passes gaseous LPG hydrocarbons from a fractionation zone to a cooler, wherein the gaseous stream is condensed. Liquid water is separated from the liquified petroleum gas hydrocarbons in a reflux drum and the total liquid hydrocarbon phase is withdrawn from the drum by a single pump. A major portion of the liquified petroleum gas hydrocarbons is passed to the fractionation zone as reflux and the remainder is passed through a cooler where the temperature is reduced sufficiently to precipitate some of the dissolved water present in the liquified petroleum gas hydrocarbons; this precipitated water is separated in a gravity separator. A portion of the liquid LPG hydrocarbons of reduced water content is dehydrated by passage through a solid adsorbent material. The spent bed of solid adsorbent material is revivified by using a portion of the reduced water content LPG hydrocarbons as the source of revivifying gas. The stream of hot revivifying gas and water vapor is at a pressure greater than that existing in the transfer line and flows to that line and is intermingled with the stream therein. If it is necessary to meet specifications for LPG, the dehydrated LPG hydrocarbons are treated to remove sulfur compounds by any of the conventional methods.

The invention is described in detail in connection with the annexed figure which forms a part of this specification. It is to be understood that the figure shows a schematic embodiment of the process. The details which have been omitted may readily be added thereto by those skilled in the LPG dehydration art.

The terms "liquified petroleum gas" and "LPG" as used herein are to be given their common meaning, namely, liquified propane, mixtures of liquified propane and propylene, any one of the liquified butanes or butenes or mixtures thereof, or a mixture of propane and butane.

The source of the liquified petroleum gas hydrocarbons may be any petroleum material which contains commercially significant amounts of the $C_3$ and $C_4$ carbon atom hydrocarbons, such as propane and butane. Examples of suitable sources of the LPG hydrocarbons are unstabilized naphtha, unstabilized light naphtha, absorption naphtha, i. e., mixture of propanes, butanes and pentanes, or natural gasoline. When it is not desired to produce LPG which consists only of propane or butane, the feed material may be a mixture of propane and butane.

In the figure, feed from source 11 is passed by way of line 12 into fractionation zone 13, herein designated as a stabilizer. Fractionating zone 13 may be any form of fractional distillation device which permits recovery of essentially pure propane or essentially pure butane or mixture thereof from the feed. In this illustration, the LPG hydrocarbon desired is propane. The feed to the stabilizer 13 contains trace amounts of ethane, some propylene, propane, a mixture of butanes and butenes and some pentane. In addition to the hydrocarbons, the feed contains sulfur compounds and dissolved water. In this illustration, the feed from source 11 amounts to 201 barrels (42 gal.) per hour. A bottoms product consisting of butane, pentane and a slight amount of propane is withdrawn and sent to storage not shown by way of line 14. In this illustration, the bottoms from stabilizer 13 amounts to 158 B. P. H.

A stream or fraction consisting essentially of fuel gas, liquified petroleum hydrocarbon gas and water vapor is withdrawn overhead from stabilizer 13 by way of transfer line 16. In this illustration, the overhead stream from stabilizer 13 includes not only the materials from the feed, but also the reflux which is introduced into stabilizer 13 by way of line 17. In this illustration, the reflux amounts to 240 B. P. H. A stream of LPG hydrocarbon gas and water vapor is introduced into line 16 by way of line 18; the source of this stream will be described hereinafter.

The two streams from lines 16 and 18 are intermingled and are passed by way of line 19 into cooler 21. In cooler 21, the LPG hydrocarbon gas and water vapor are condensed and the liquids and fuel gas are passed by way of line 22 into reflux drum 23. Reflux drum 23 is adapted for the gravity separation of liquid water phase from liquid LPG hydrocarbon phase. Fuel gas which consists of ethane and propane and some water vapor is withdrawn from reflux drum by way of line 26 and is passed to the refinery fuel system. In this illustration, the fuel gas discharged from reflux drum 23 amounts to 3.0 B. P. H., calculated as liquid.

Liquid water is withdrawn by way of line 27 from reflux drum 23 and is passed to a sewer. In this illustration, this water stream from line 27 amounts to 0.97 gallon per hour. (Herein the illustrative flows are given as barrels per hour, B. P. H., in the case of hydrocarbon stream and as gallons per hour, G. P. H., in the case of water content or water stream discharged.)

The total liquid LPG hydrocarbon is withdrawn from reflux drum 23 by way of line 29 and is placed, by means of pump 31, into line 32. Pump 31 permits the introduction of the reflux by way of line 17 into the upper portion of stabilizer 13. It is obvious that by the use of an elevated reflux drum, the liquid LPG hydrocarbons could be returned to stabilizer 13 by gravity flow. The liquid LPG hydrocarbons in line 32 consist of liquid propane and butane, dissolved water, and a slight amount of sulfur compounds. The major portion of the liquid in line 32 is passed by way of line 17 to stabilizer 13 for use as reflux. In this illustration, the reflux stream amounts to 240 B. P. H. and contains 1.13 G. P. H. of dissolved water. The remainder of the liquid LPG hydrocarbon phase is forced, by way of valved line 33, into cooler 34. In cooler 34, the liquid LPG hydrocarbons are cooled to cause the precipitation of some of the dissolved water contained therein. In this illustration, the material in line 32 is at a temperature of about 135° F. and at 377 p. s. i. g. Line 33 contains 47.5 B. P. H. of liquid LPG hydrocarbon phase containing 0.22 G. P. H. of water. In cooler 34, the liquid LPG hydrocarbons are cooled to a temperature of 90° F. From cooler 34, the cooled liquid LPG hydrocarbon phase is passed by way of line 36 into separator 37. Separator 37 is provided with means for gravity separation of liquid water phase from liquid hydrocarbon phase. In separator 37, liquid water is withdrawn from the system by way of line 38. In this illustration, 0.17 G. P. H. of water are removed. A liquid LPG hydrocarbon phase of reduced water content is passed from separator 37 into line 39.

A portion of the liquid LPG hydrocarbon phase of reduced water content is passed into line 41 from line 39. From line 41, this stream may be passed through various lines to either one or both of vessels containing a solid adsorbent material. Since the solid adsorbent material must be periodically revivified, the dehydration procedure is necessarily cyclic and more than one bed must be utilized to obtain a continuous process. In this illustration, only 2 vessels containing solid adsorbent material are shown. However, it is to be understood that 3 or more beds may be utilized. Herein, the liquid from line 41 is passed by way of valved line 42 in up flow through dryer 43. Also, liquid from line 41 may be passed by way of valved line 44 and line 46 in up flow through dryer 47.

Dryers 43 and 47 are elongated cylindrical vessels, each containing a bed of solid adsorbent material suitable for removing dissolved water from a liquid or gaseous hydrocarbon. Examples of suitable solid adsorbents are alumina, bauxite and silica gel. In this illustration, activated alumina is used as the solid adsorbent.

The liquid LPG hydrocarbon phase is passed through the dryers 43 and 47 and the dehydrated liquid LPG hydrocarbons are withdrawn from dryer 43 by way of line 51 and valved line 52 and from dryer 47 by way of line 53 and valved line 54. Valved line 52 and valved line 54 are joined to line 56.

The dehydrated liquid LPG hydrocarbons are passed by way of line 56 into drum 57. Drum 57 is filled with flake KOH which removes mercaptans and sulfur material from the liquid LPG hydrocarbons. Product liquid LPG is removed from drum 57 and is passed to storage by way of line 58. Liquids may be withdrawn periodically from drum 57 by way of valved line 59. The product LPG from line 58 contains essentially no water, is sweet to the doctor test, and meets LPG specifications with respect to corrosion and other characteristics.

The passage of liquid LPG hydrocarbon containing dissolved water through dryers 43 and 47 is continued until the solid adsorbents have taken up so much water that the effluent from the beds will not meet LPG specifications even when blended with the first portion of the liquid LPG hydrocarbon passed through the beds. At this time, the solid adsorbent is considered as spent and must be revivified before it can be used further. A portion of the liquid LPG hydrocarbon phase from line 39 is passed by way of valved line 61 into heater 62. In heater 62, the liquid LPG hydrocarbons are gasified and raised to a temperature sufficiently high to effectively desorb water from the spent bed. Generally, the hot LPG gas will be at a temperature between about 400° F. and 500° F. Also, the hot gases will be raised to a pressure high enough so that gases exiting from the beds of solid adsorbent will be at a pressure sufficiently greater than that existing in transfer line 16 in order that the exit gas will be able to flow and be intermingled with the material from line 16 without the use of a compressor. In this illustration, the hot gas from heater 62 is at a temperature of 435° F. and a pressure of 315 p. s. i. g. 7.5 B. P. H. of revivifying LPG gas, calculated as liquid, is passed through heater 62. In this illustration, the pressure at the top of stabilizer 13 is 305 p. s. i. g.

The hot LPG gas is passed by way of checked-valved line 63 and valved line 64 and line 51 in down flow through vessel 43. Also, the hot gas may be passed by way of line 63, valved line 66 and line 53 in down flow through vessel 47. The flow of hot gas through the bed of solid adsorbent is continued until all of the adsorbed water has been removed in the form of water vapor. In general, it has been found that the bed is completely revivified when the exit gases discharging from the adsorbent vessel have reached a temperature of about 390° F.

The exit gas which consists of LPG hydrocarbon gas, and desorbed water in the form of water vapor is passed out of drum 43 by way of line 42 and valved line 68 into line 69. The exit gas from dryer 47 is passed by way of line 46 and valved line 71 into line 69. The exit gas is flowed by way of line 69 and checked-valved line 72 and line 18 into line 19 where it is intermingled with the stream from transfer line 16. This exit stream consists of 7.5 B. P. H. of LPG hydrocarbon gas and 0.05 G. P. H. of water vapor calculated as liquid.

In the illustration, 40 B. P. H. of specification LPG consisting of 95 volume percent of propane (containing a slight amount of propylene) and 5 volume percent of butane and butenes is produced. The revivifying gas is passed back into the stream without loss to LPG production.

Thus it can be seen that the process of this invention provides a simple and economical method of producing LPG. By tying together the fractionating zone, which is the source of the LPG hydrocarbon gas, and the solid adsorbent material which removes dissolved water, it is possible to reduce the capital equipment investment by eliminating a compressor and reducing the amount of heat transfer capacity which would have been needed had a closed circuit type of revivifying gas operation been used; or, on the other hand, the sacrifice of LPG gas to fuel gas has been avoided, while saving this capital investment.

Thus having described the invention, what is claimed is:
1. A process for the production of dehydrated liquified petroleum gas which comprises (1) fractionating a petroleum distillate containing LPG hydrocarbons to obtain a fraction consisting essentially of fuel gas, LPG hydrocarbon gas and water vapor, (2) cooling said fraction to condense the LPG hydrocarbons and water, (3) decanting a liquid water phase from liquid LPG hydrocarbon phase containing dissolved water, (4) withdrawing a stream of said liquid LPG hydrocarbon phase from said decanting zone, applying thereto a pressure sufficient to permit the cycling of said stream as reflux to said fractionating zone, (5) cycling a portion of said stream to said fractionating zone as reflux, (6) passing another portion of said stream to a cooler wherein the temperature of said stream is reduced sufficiently to precipitate some of the water dissolved therein, (7) decanting said precipitated water from liquid LPG hydrocarbon of reduced dissolved water content, (8) passing a portion of the reduced water content liquid LPG hydrocarbon of step (7) through a solid adsorbent material to obtain a liquid LPG hydrocarbon stream of essentially no water content and continuing said dehydration until said adsorbent has become spent, (9) heating another portion of reduced water content liquid LPG hydrocarbon of step (7) to obtain a gas having a temperature suitable for desorbing water from said spent adsorbent and having a pressure higher than that existing in said fraction of step (1) and passing said gas through said spent adsorbent until said adsorbent is revivified, and (10) passing the mixture of gas and vapor of desorbed water into the fraction of step (1).

2. The process of claim 1 wherein said LPG hydrocarbon is propane.

3. The process of claim 1 wherein said LPG hydrocarbon is butane.

4. The process of claim 1 wherein said adsorbent is alumina.

5. A process for the production of liquified petroleum gas which comprises (1) fractionating a petroleum hydrocarbon containing propane to produce a stream consisting essentially of fuel gas, propane gas and water vapor at superatmospheric pressure, (2) intermingling said stream with a stream of propane gas and water vapor, (3) cooling the intermingled streams to condense propane and water, (4) decanting liquid water from a liquid propane phase containing dissolved water, (5) pumping said liquid propane phase from said decanting zone and passing a major portion thereof to said fractionating zone as reflux, (6) passing the remainder of said liquid propane phase through a cooler to reduce the temperature sufficiently to precipitate some liquid water from the liquid propane, (7) decanting liquid water from liquid propane which contains more dissolved water than LPG specifications permit, (8) adsorbing dissolved water from a portion of the liquid propane from step (7) by passing it through a bed of solid adsorbent material and continuing said passage until the adsorbent is spent, (9) revivifying the spent adsorbent by heating a portion of the liquid propane from step (7) to a temperature of between about 400° F. and 500° F. and a pressure such that the hot gas exiting from the bed of adsorbent can flow into the intermingling zone of step (2) and passing the hot gas through said bed until the adsorbent has been revivified, (10) flowing the stream of propane gas and water vapor, exiting from the bed, to the intermingling zone of step (2), and (11) treating the dehydrated liquid propane to remove deleterious sulfur compounds, which treated liquid propane is specification LPG.

6. The process of claim 5 wherein the completion of the revivification is evidenced by an exit gas temperature of about 390° F.

References Cited in the file of this patent

UNITED STATES PATENTS

| | | |
|---|---|---|
| 2,672,034 | Morrow | Mar. 16, 1954 |
| 2,677,438 | Reid | May 4, 1954 |